(12) United States Patent
Qiao et al.

(10) Patent No.: US 11,043,811 B2
(45) Date of Patent: Jun. 22, 2021

(54) REACTIVE POWER CONTROL METHOD, DEVICE AND SYSTEM

(71) Applicant: BEIJING GOLDWIND SCIENCE & CREATION WINDPOWER EQUIPMENT CO., LTD., Beijing (CN)

(72) Inventors: Yuan Qiao, Beijing (CN); Yi Zhang, Beijing (CN); Di Xiao, Beijing (CN)

(73) Assignee: Beijing Goldwind Science & Creation Windpower Equipment Co. Ltd., Beijing (CN)

( * ) Notice: Subject to any disclaimer, the term of this patent is extended or adjusted under 35 U.S.C. 154(b) by 663 days.

(21) Appl. No.: 15/779,538

(22) PCT Filed: Jul. 7, 2017

(86) PCT No.: PCT/CN2017/092156
§ 371 (c)(1),
(2) Date: May 28, 2018

(87) PCT Pub. No.: WO2018/113265
PCT Pub. Date: Jun. 28, 2018

(65) Prior Publication Data
US 2021/0083480 A1    Mar. 18, 2021

(30) Foreign Application Priority Data
Dec. 20, 2016    (CN) .......................... 201611195291.X (51) Int. Cl.
*H02J 3/18* (2006.01)
*F03D 7/02* (2006.01)
(Continued)

(52) U.S. Cl.
CPC ............ *H02J 3/1821* (2013.01); *F03D 7/028* (2013.01); *F03D 9/25* (2016.05); *H02J 3/16* (2013.01);
(Continued)

(58) Field of Classification Search
CPC .. H02J 3/1821; H02J 3/16; H02J 3/381; H02J 2300/24; H02J 13/00002; H02J 3/1814;
(Continued)

(56) References Cited

U.S. PATENT DOCUMENTS 9,728,974 B2    8/2017   Rudolph et al.
2015/0102674 A1    4/2015   Rudolph et al.
2016/0099566 A1    4/2016   Murphy et al.

FOREIGN PATENT DOCUMENTS

CN    101510692 A    8/2009
CN    102354992 A    2/2012
(Continued)

OTHER PUBLICATIONS

International Search Report issued in International Application No. PCT/CN2017/092156, mailed from the State Intellectual Property Office of China dated Oct. 12, 2017.
(Continued)

*Primary Examiner* — Robert L Deberadinis
(74) *Attorney, Agent, or Firm* — Finnegan, Henderson, Farabow, Garrett & Dunner, LLP (57) ABSTRACT

A reactive power control method, a reactive power control device, and a reactive power control system are provided. The device includes: a communication interface, configured to receive a reactive power requirement command; an input interface, configured to acquire an electrical quantity parameter of a preset control point; a strategy calculation module, configured to calculate a target reactive power value meeting the reactive power requirement command based on the
(Continued)

electrical quantity parameter, and allocate reactive power to be provided by a regulatable reactive device based on the target reactive power value; and an output interface, configured to send a command for providing the allocated reactive power to the regulatable reactive device.

20 Claims, 6 Drawing Sheets

(51) Int. Cl.
*H02J 3/38* (2006.01)
*F03D 9/25* (2016.01)
*H02J 3/16* (2006.01)
*H02J 13/00* (2006.01)

(52) U.S. Cl.
CPC ....... *H02J 3/381* (2013.01); *F05B 2270/1033* (2013.01); *H02J 3/1814* (2013.01); *H02J 3/1842* (2013.01); *H02J 3/1871* (2013.01); *H02J 13/00* (2013.01); *H02J 13/00002* (2020.01); *H02J 2300/24* (2020.01); *H02J 2300/28* (2020.01)

(58) Field of Classification Search
CPC ........ H02J 3/1842; H02J 3/1871; H02J 13/00; H02J 3/38; H02J 3/18; F03D 9/25; F03D 7/028; F05B 2270/1033; F05B 7/02
See application file for complete search history.

(56) References Cited

FOREIGN PATENT DOCUMENTS

| | | |
|---|---|---|
| CN | 102882229 A | 1/2013 |
| CN | 102299527 B | 5/2013 |
| CN | 103280814 A | 9/2013 |
| CN | 103346577 B | 6/2016 |
| CN | 106786644 A | 5/2017 |
| JP | 2003-199252 A | 7/2003 |
| JP | 2015-077067 A | 4/2015 |
| JP | 2016-182021 A | 10/2016 |

OTHER PUBLICATIONS

Extended European Search Report issued by European Patent Office for counterpart European Application No. 17868494.0, dated Jul. 15, 2019.

Office Action issued in Chinese Patent Application No. 201611195291.X, dated Oct. 31, 2018.

Office Action issued in Australian Patent Application No. 2017352548, dated Nov. 9, 2018.

REACTIVE POWER CONTROL METHOD, DEVICE AND SYSTEM

CROSS-REFERENCE TO RELATED APPLICATIONS

This application is a National Phase Application of International Application No. PCT/CN2017/092156, filed on Jul. 7, 2017, which claims priority to Chinese Patent Application No. 201611195291.X, titled "REACTIVE POWER CONTROL METHOD, DEVICE AND SYSTEM", filed with the State Intellectual Property Office of China on Dec. 20, 2016, both of which are incorporated herein by reference in their entireties.

FIELD

The present disclosure relates to the technical field of reactive power control, and in particular to a reactive power control method, a reactive power control device and a reactive power control system.

BACKGROUND

Currently, new energy such as wind power generation and photovoltaic power generation is developed in a large scale and centralized manner in most regions of our country. Generally, a large-scaled new energy development region is arranged with dozens of new energy sites, with a single new energy site having a large installed capacity. A large-scaled new energy grid-connection brings an extreme challenge to the operation of an electrical grid due to an inherent intermittent feature of new energy generation. In addition, since a local load and a conventional power support are generally lacked in the new energy grid-connection region, electric energy generated with the new energy needs to be provided to a load center via a long distance. In this case, a change in the new energy output in an electric-provided channel is seriously affected by a reactive power wave. A high proportion of the new energy affects a voltage support capability of the electrical grid, a large fluctuation in the output causes difficulties in adjusting the voltage of the electrical grid, and voltage issues in local regions are particularly apparent.

In an existing new energy site, reactive power is generally controlled by a regulatable reactive device. However, existing Static Var Compensators (SVCs) and Static Var Generators (SVGs) have uneven performances and different control modes. For example, some of the above SVCs and SVGs take a reactive zero cut at a high-voltage side bus of a new energy voltage boost site as a target, and controls based on fixed reactive power. Some of the above SVCs and SVGs take a high-voltage side bus or a low-voltage side bus of the voltage boost site as a target and controls based on a fixed voltage. Moreover, most of new energy apparatuses having reactive power regulation capabilities are not utilized effectively. In this case, a reactive power regulation margin of the new energy site is failed to play its due system voltage control capability.

Besides, a centralized reactive power compensation device in a wind power generation site generally can only control a reactive power output of itself, without controlling other reactive devices in the site such as a wind power generator or a main transformer tap. The reactive power compensation device of a generator set in the wind power generation site has a high self power consumption which generally exceeds 1.5% of the capacity of itself, hence has a high utilization cost. In addition, the centralized reactive power compensation device in the wind power generation site needs an occupation area more than 50 square meters, a corresponding device installation room, a design of heat dissipation system and the like, needs an electric power once connection and an electric power secondary connection, thereby having high consumption in construction cost, land acquisition cost and project cost.

SUMMARY

In view of the above one or more problems, a reactive power control method, a reactive power control device and a reactive power control system are provided according to embodiments of the present disclosure.

A reactive power control device is provided according to a first aspect. The device includes:

a communication interface, configured to receive a reactive power requirement command;

an input interface, configured to acquire an electrical quantity parameter of a preset control point;

a strategy calculation module, configured to calculate a target reactive power value meeting the reactive power requirement command based on the electrical quantity parameter, and allocate reactive power to be provided by a regulatable reactive device based on the target reactive power value; and an output interface, configured to send a command for providing the allocated reactive power to the regulatable reactive device.

A reactive power control system is provided according to a second aspect. The system includes:

at least one wind power generator set arranged on an aggregate line;

the above control device connected to the at least one wind power generator set via a communication line;

a reactive power compensation device communicatively connected to the at least one wind power generator set and the control device; and a data acquisition device, configured to acquire an electrical quantity parameter of a preset control point and connected to the control device via a communication line.

A reactive power control method is provided according to a third aspect. The method includes:

receiving a reactive power requirement command and acquiring a reactive power command value M1 based on the reactive power requirement command;

acquiring an electrical quantity parameter of a preset control point and calculating a reactive power calculated value M2 of the preset control point based on the electrical quantity parameter;

calculating a difference ΔM between the reactive power command value M1 and the reactive power calculated value M2;

obtaining a target reactive power value based on the difference ΔM;

comparing the difference ΔM with a preset dead band value;

generating a reactive power allocation strategy based on the comparison result and the target reactive power value, where the reactive power allocation strategy is used for calculating a reactive power capability value of a regulatable reactive device in a wind power generation site and allocating reactive power to be provided by the regulatable reactive device; and based on the reactive power allocation strategy, sending, to the regulatable reactive device, a command for indicating the regulatable reactive device to generate the allocated reactive power.

It should be noted that, the reactive power control method, reactive power control device and reactive power control system may be not only widely applied in the wind power generation site, but also other new energy sites such as a photovoltaic power plant.

In the embodiments of the present disclosure, the target reactive power value meeting the reactive power requirement command is calculated by acquiring the electrical quantity parameter of the preset control point. The reactive power to be provided by the regulatable reactive device is allocated based on the target reactive power value. The regulation capability of the regulatable reactive device in the wind power generation site can be fully and effectively utilized via the information interaction between the control device and the regulatable reactive device, thereby reducing the power losses and increasing the power generation benefits.

BRIEF DESCRIPTION OF THE DRAWINGS

The drawings to be used in the description of the embodiments will be described briefly as follows, so that the technical solutions according to the embodiments of the present disclosure will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

In order to make the objects, technical solutions and advantages of the embodiments of the present disclosure clearer, the technical solutions according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

It should be noted that, the embodiments of the present application and the features in the embodiments may be combined with one another as long as there is no conflict.

The present application is described below in detail in conjunction with the drawings and embodiments.

It should be noted that, a reactive power control method, a reactive power control device and a reactive power control system according to the embodiments of the present disclosure may be not only widely applied in a wind power generation site, but also other new energy sites such as a photovoltaic power plant. For simplicity, it is described below in detail only by taking the wind power generation site as an example. Control methods for other new energy sites are similar to the control principle of the wind power generation site, and are not described.

Figure 1:
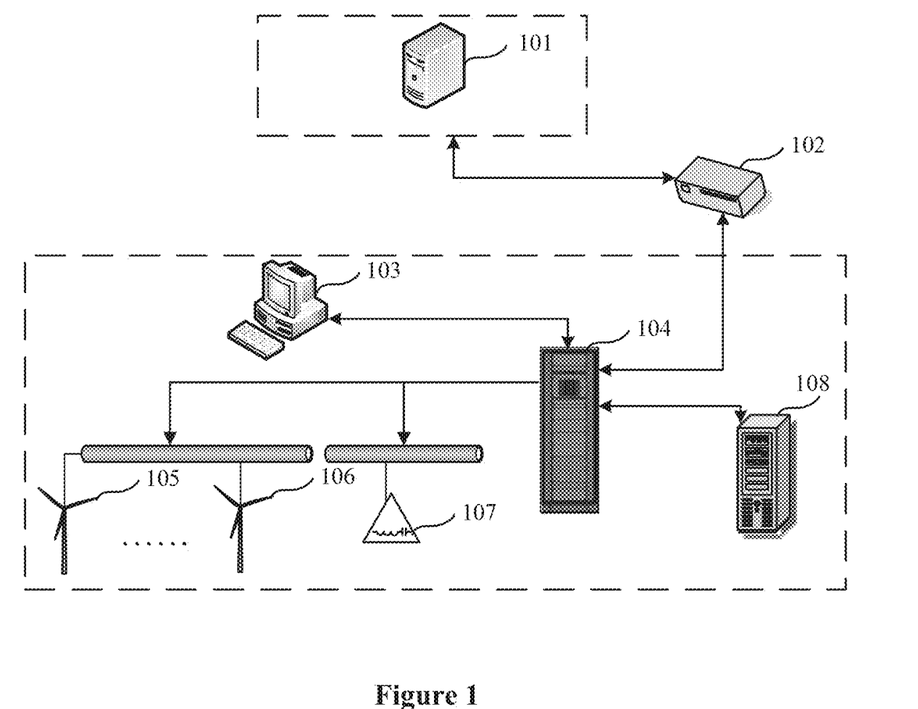
FIG. 1 is a schematic diagram of a topology structure of a control system which can be applied in an embodiment of the present disclosure.

FIG. 1 is a schematic diagram of a topology structure of a control system which can be applied in an embodiment of the present disclosure.

As shown in FIG. 1, the topology structure may include: an Automatic Voltage Control (AVC) control system 101 arranged in a power grid company, a telemechanical device 102 and a Voltage/Var Management Platform (VMP) workstation 103 arranged in a wind power generation site, a VMP management device 104, wind power generators 105 and 106, a reactive power compensation device 107 and an acquirer 108.

The AVC server 101 may be configured to issue a scheduling command to achieve a power grid scheduling function. The telemechanical device 102 may be a device completing functions including telemetry, remote signaling, remote control, remote adjustment and the like. The VMP workstation 103 may analyze, calculate and manage the acquired data. The wind power generators 105 and 106 may perform a wind power generation or a power adjustment by using wind energy. The reactive power compensation device 107 may be a photovoltaic inverter, a capacitor, a Static Var Compensator SVC, a Static Var Generator SVG and the like. The acquirer 108 may be a Potential Transformer (PT) and a Current Transformer (CT) which may acquire a PT signal and a CT signal.

The VMP management device 104 may interact information with the VMP workstation 103, the wind power generators 105 and 106, the reactive power compensation device 107, the acquirer 108 and the AVC server 101. For example, the VMP management device 104 may perform bidirectional information interactions with an on-load-tap of a main transformer of a voltage boost site and the regulatable reactive device such as the wind power generators 105 and 106 and the reactive power compensation device 107. The VMP management device 104 may achieve the above information interactions by being installed with a VMP system. The VMP system may provide multiple communication protocols for different scheduling architectures.

A first implementation of a communication between the VMP management device 104 and the AVC server 101 may be that the communication between the VMP management device 104 and the AVC server 101 is forwarded by the telemechanical device 102. The VMP system may provide a Modbus TCP/RTU protocol, communicate with the telemechanical device 102 of the wind power generating site, accept a control command scheduled by the AVC server 101 and upload corresponding data. The VMP management device 104 may upload telemetry data and remote signaling data required by the scheduling, to the telemechanical device 102 according to the Modbus TCP/RTU protocol. The telemechanical device 102 may forward the telemetry data and remote signaling data required by the scheduling, to the AVC server 101 according to the IEC104 protocol. In addition, the telemechanical device 102 may receive a remote adjustment command issued by the AVC server 101, and forward the remote adjustment command to the VMP management device 104.

Moreover, a second implementation of the communication between the VMP management device 104 and the AVC server 101 may be described as below. The VMP management device 104 may directly communicate with and control the AVC server 101 according to the IEC104 protocol. The VMP management device 104 may directly upload the telemetry data and remote signaling data required by the scheduling, to the AVC server 101 according to the IEC104 protocol. The AVC server 101 may issue a remote adjustment command to the VMP management device 104 according to the IEC 104 protocol.

The VMP management device 104 may further analyze, calculate and manage the acquired data, to control and manage reactive power, which is described hereinafter. It should be understood that, FIG. 1 may further include an auxiliary network communication device such as a router, a wired communication link, a wireless communication link, an optical fiber cable or the like. In addition, the numbers of the devices in FIG. 1, such as the server and wind power generator, are only illustrative, and may be flexibly adjusted according to actual requirements.

The topology structure may be applied in the following embodiments. For simplicity, contents of the embodiments may be referred to one another.

Figure 2:
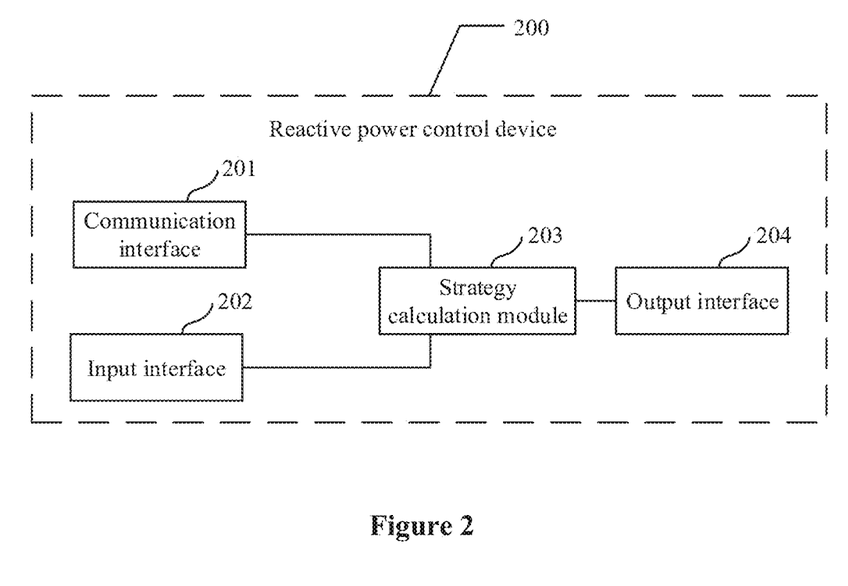
FIG. 2 is a schematic structural diagram of a reactive power control device according to an embodiment of the present disclosure.

FIG. 2 is a schematic structural diagram of a reactive power control device according to an embodiment of the present disclosure.

A reactive power control device 200 according to the embodiments may be applied to the scenario described in FIG. 1. The control device 200 may be the VMP management device 104 in FIG. 1.

As shown in FIG. 2, the reactive power control device 200 may include a communication interface 201, an input interface 202, a strategy calculation module 203 and an output interface 204. The communication interface 201 may be configured to receive a reactive power requirement command. The input interface 202 may be configured to acquire an electrical quantity parameter of a preset control point. The strategy calculation module 203 may calculate a target reactive power value meeting the reactive power requirement command based on the electrical quantity parameter, and allocate reactive power to be provided by a regulatable reactive device based on the target reactive power value. The output interface 204 may send a command for providing the allocated reactive power to the regulatable reactive device.

Figure 3:
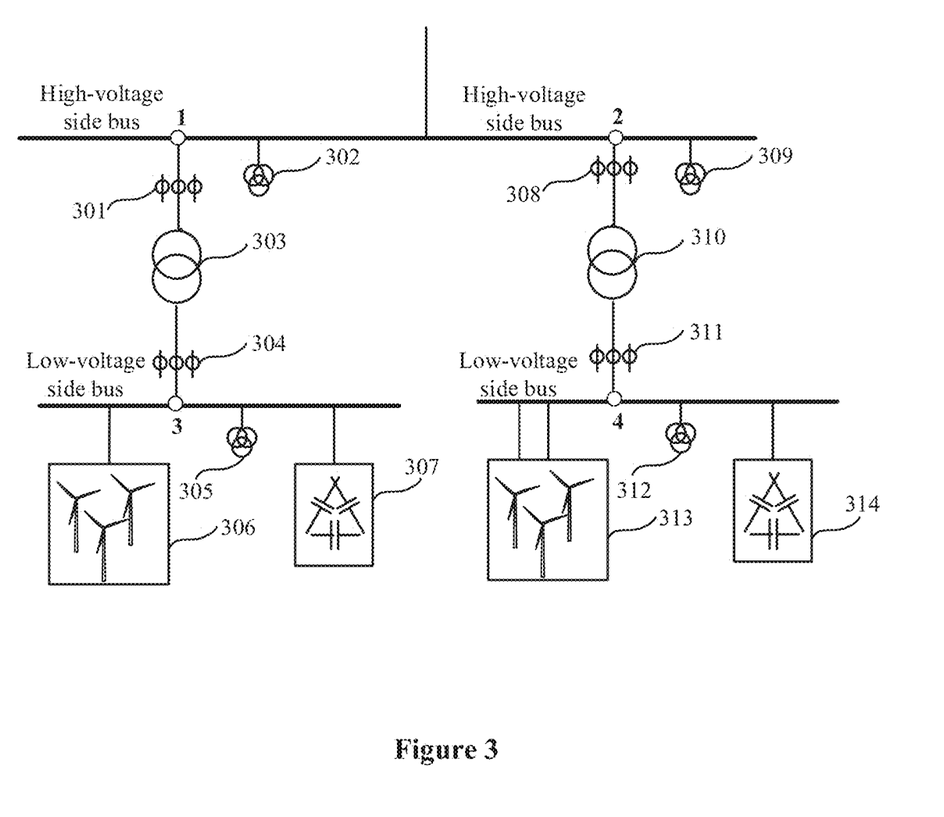
FIG. 3 is a schematic diagram of arrangement of control points for a wind power generation site according to an embodiment of the present disclosure.

In the embodiment, the electrical quantity parameter may include a current parameter and a voltage parameter of the preset control point (selection of the preset control point is described in an embodiment according to FIG. 3). The electrical quantity parameter may be acquired by the acquirer 108 in FIG. 1. Then, the acquired electrical quantity parameter is acquired with the input interface 202. In addition, an acquisition element may be further integrated in the reactive power control device 200, to directly acquire the electrical quantity parameter. For example, a PT signal and a CT signal of the preset control point may be respectively acquired by using the PT and CT. It can be understood that, the PT and CT may be arranged around the control point instead of being arranged at the control point. In this case, the acquired electrical quantity parameter may be considered as a parameter of the control point.

In some embodiments, the electrical quantity parameter of the preset control point may be acquired in a hard-wired way. Therefore, by directly acquiring the electrical quantity parameter of the preset control point in the hard-wired way, it can be ensured that the acquired data is accurate and has a small time delay, thereby ensuring the accuracy and reliability of the reactive power control.

In some embodiments, the regulatable reactive device includes a wind power generator set and a reactive power compensation device. The reactive power compensation device may include at least one of the following devices in a new energy site: an inverter, a capacitor, a static var compensator SVC and a static var generator SVG In some embodiments, the control device 200 may have a local control manner and a remote control manner, and may provide at least one of a voltage control mode, a reactive power control mode and a power factor control mode.

FIG. 3 is a schematic diagram of arrangement of control points for a wind power generation site according to an embodiment of the present disclosure.

As shown in FIG. 3, the wind power generation site includes a high-voltage side bus, a low-voltage side bus, CTs 301, 304, 308 and 311, PTs 302, 305, 309 and 312, main transformers 303 and 310, wind power generator sets 306 and 313, and SVCs 307 and 314. The wind power generator sets 306 and 313 are connected to the low-voltage side bus via an aggregate line (not shown in the drawing), and the low-voltage side bus is connected to the high-voltage side bus via the main transformer 303 or 310. The CT 301 is arranged between the high-voltage side bus and the main transformer 303, the CT 304 is arranged between the low-voltage side bus and the main transformer 303, the CT 308 is arranged between the high-voltage side bus and the main transformer 310, and the CT 311 is arranged between the low-voltage side bus and the main transformer 310. The PT 302 and PT 309 are arranged on the high-voltage side bus, and the PT 305 and the PT 312 are arranged on the low-voltage side bus.

A control point 1 may be arranged at an interface point between the main transformer 303 and the high-voltage side bus, a control point 2 may be arranged at an interface point between the main transformer 310 and the high-voltage side bus, a control point 3 may be arranged at an interface point between the main transformer 303 and the low-voltage side bus, and a control point 4 may be arranged at an interface point between the main transformer 310 and the low-voltage side bus.

The control points may be selected based on a current control manner. In the local control manner, the preset control point may be selected from the control points 3 and 4. In the remote control manner, the preset control point may be selected from the control points 1 and 2.

Figure 4:
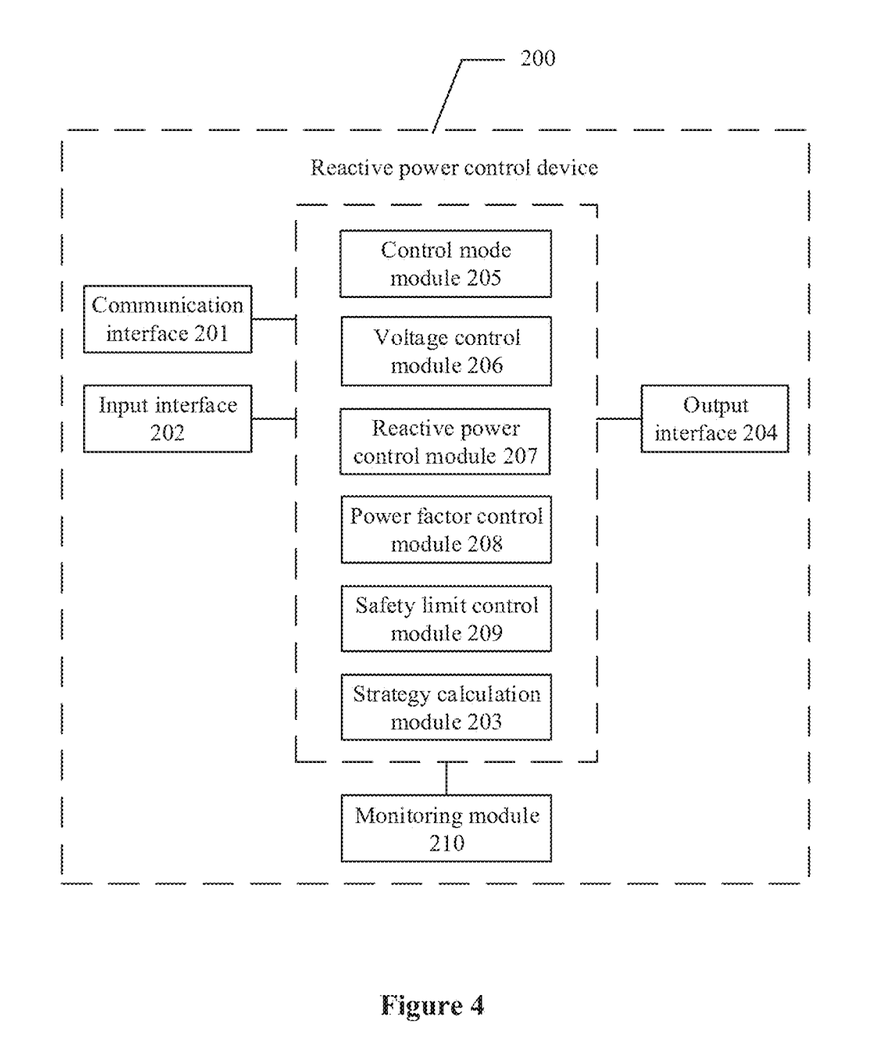
FIG. 4 is a schematic structural diagram of a reactive power control device according to one or more embodiments of the present disclosure.

FIG. 4 is a schematic structural diagram of a reactive power control device according to one or more embodiments of the present disclosure.

As shown in FIG. 4, the reactive power control device 200 may include a communication interface 201, an input interface 202, a strategy calculation module 203, an output interface 204, a control mode module 205, a voltage control module 206, a reactive power control module 207, a power factor control module 208, a safety limit control module 209 and a monitoring module 210.

In a first embodiment in FIG. 4, the safety limit control module 209 may be added based on the embodiment corresponding to FIG. 2. The safety limit control module 209 may be configured to set a safety constraint condition for voltage control and send a safety control command to the strategy calculation module 203. The safety control command is used for instructing the strategy calculation module to make the safety constraint condition be met in allocating the reactive power.

The safety constraint condition includes at least one of: a voltage limit constraint of the preset control point; a voltage abrupt change amount constraint of the preset control point; a terminal voltage constraint of the wind power generator set; a maximum reactive power capability and available reactive power capability constraint of the wind power generator set; a temperature constraint of a converter of the wind power generator set; and a maximum reactive power compensation capability constraint of the reactive power compensation device.

In a second embodiment in FIG. 4, the control mode module 205 may be added based on the embodiment corresponding to FIG. 2. The control mode module 205 may be configured to provide at least one of a voltage control mode, a reactive power control mode and a power factor control mode, in the local control manner or remote control manner.

In a third embodiment in FIG. 4, the voltage control module 206 may be added based on the second embodiment in FIG. 4. The voltage control module 206 is configured to select a voltage control mode. In the embodiment, the communication interface 201 is further configured to receive a voltage requirement command under the voltage control mode, and the input interface 202 is further configured to acquire a voltage parameter of the preset control point under the voltage control mode.

In a fourth embodiment in FIG. 4, the reactive power control module 207 may be added based on the second embodiment in FIG. 4. The reactive power control module 207 is configured to select the reactive power control mode. In the embodiment, the communication interface 201 is further configured to receive a reactive power requirement command under the reactive power control mode, and the input interface 202 is further configured to acquire a reactive power parameter of the preset control point under the reactive power control mode.

In a fifth embodiment in FIG. 4, the power factor control module 208 may be added based on the second embodiment in FIG. 4. The power factor control module 208 is configured to select the power factor control mode. In the embodiment, the communication interface 201 is further configured to receive a power factor requirement command under the power factor control mode, and the input interface 202 is further configured to acquire a power factor parameter of the preset control point under the power factor control mode.

In a sixth embodiment in FIG. 4, the monitoring module 210 may be added based on the embodiment corresponding to FIG. 2. The monitoring module 210 is configured to acquire, in real time, operation data during a reactive power control process, analyze and process the operation data acquired in real time and display the processed data in real time.

It should be noted that, the monitoring module 210 may be arranged in the reactive power control device 200 or may be arranged separately, for monitoring the operation of the reactive power control device 200. The monitoring module 210 may be arranged flexibly as needed, which is not limited herein.

It should be appreciated by those skilled in the art that, the modules in the examples described according to the embodiments disclosed herein may be implemented as electronic hardware, or combinations of the electronic hardware and computer software. Whether the functions realized by these components are implemented as hardware or software depends upon the particular application and design constraints imposed on the technical solutions. In the case that the functions are implemented as hardware, the hardware may be, for example, electrical circuit, application specific integrated circuit (ASIC), appropriate firmware, plug-in component and functional card. In the case that the functions are implemented as software, elements of the present disclosure are programs or code segments for performing required tasks. The programs or code segments may be stored in a machine-readable medium or may be transferred over a transmission medium or communication link via a data signal carried in a carrier. The "machine-readable medium" may include any medium which can store or transmit information. Examples of the machine-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The code segments may be downloaded via computer networks such as the Internet, Intranet, etc. Those skilled in the art can implement the described function in varying ways for each particular application.

It can be appreciated by those skilled in the art that, the function modules of the examples described according to the embodiments disclosed herein can be implemented as electronic hardware, computer software, or combinations thereof. To clearly illustrate this interchangeability of hardware and software, components for the examples have been described above generally in terms of their functions. Whether these functions are implemented as hardware or software depends upon the particular application and design constraints imposed on the technical solutions. Those skilled in the art can implement the described function in varying ways for each particular application.

The above embodiments may be based on a concept of decentralized reactive power compensation, and take PLC as the control module. An industrial server communicates with a wind power generator of the wind power generation site and a dynamic reactive power compensation device of the wind power generation site, and it is further arranged with switch-in nodes and switch-out nodes which communicate with and control a fixed switched capacitor and reactor.

It should be noted that, the reactive power control device 200 may be further arranged with an AC/DC conversion module for converting the acquired voltage and current, a communication module for information interaction with the wind power generator, the reactive power compensation device and the like, and a switch-in and switch-out module for controlling devices such as the switched capacitor and reactor.

It can be seen from the above that, in the embodiments of the present disclosure, bi-directional information interactions between a regulatable reactive device, such as wind power generator, photovoltaic device, scheduling device and SVC/SVG, and on-load-tap of the main transformer of the voltage boost site may be achieved with the control device. In this case, VMP can control more than five hundreds devices, thereby achieving a high cost performance and a uniform control strategy.

The device according to the embodiment of the present disclosure only needs to be connected to a secondary power support system, has a self-power consumption lower than 1.5 kW and occupies an area less than 0.5 square meters, thereby greatly reducing the construction, area and cost, of the device.

A monitoring function is added according to the embodiment of the present disclosure, to remotely operate the VMP device in real time in a monitoring room to achieve functions of: issuing a control command; monitoring, in real time, real-time data such as high-voltage side voltage and low-voltage side voltage of the main transformer, active power and reactive power, a voltage control real-time curve effect, voltage safety regions of the high-voltage side bus and low-voltage side bus and a current location, real-time data of all wind power generator, photovoltaic device, SVC/SVG and the like, a total reactive power capability and outputted capacity statistics of the wind power generation site and the photovoltaic plan; improving an accuracy of a real-time historical voice alarm of reactive power control; accurately managing users; instructing to issue event statistics; and analyzing failure processing historical data. In this way, requirements of the power grid and on-site attendants are met.

The device according to the embodiment of the present disclosure can communicate with a main transformer tap controller and issue commands to the main transformer tap controller, without integrating the tap control logic into a reactive power control logic of the whole wind power generation site.

The monitoring software may run on an industrial computer (may also run on the monitoring module 210). A communication protocol for monitoring the information interaction may be Modbus TCP and the like. All operation data sets in the VMP management device 104 may be acquired in real time with the monitoring software, and these operation data sets are stored in a real-time historical database. After the real-time data is analyzed by the monitoring software, a historical trend diagram, control strategy data, alarm information and the like may be obtained and then are displayed in real time. The analyzed historical database may be provided to a user for failure analysis and statistics. In addition, the monitored data may be processed in other manners as needed, to meet different application requirements.

In the embodiment of the present disclosure, the failure analysis may be performed based on a large amount of historical data, and the reactive power capability, voltages, safety regions of the wind power generation site can be managed in real time, to facilitate observation of an on-site voltage reactive power control effect by the user. In addition, a control command and a large amount of failure analysis historical data may be issued based on a real-time waveform, a site reactive power capability and safety regions.

In the embodiment of the present disclosure, all application sites may have uniform versions of VMP software and hardware, thereby facilitating maintenance and upgrading.

With the embodiment of the present disclosure, a total construction investment for centralized reactive power compensation devices by a customer may be greatly reduced in an application of a wind power generation site to be newly constructed, and power consumptions of the reactive power compensation devices may be greatly reduced in an application of a constructed wind power generation site.

Besides, a reactive power control system for a wind power generation site is provided according to an embodiment of the present disclosure. The system may include: at least one wind power generator set arranged on an aggregate line; the above control device 200 connected to the at least one wind power generator set via a communication line; a reactive power compensation device communicatively connected to the at least one wind power generator set and the control device; and a data acquisition device, configured to acquire an electrical quantity parameter of a preset control point and connected to the control device 200 via a communication line.

It can be understood that, the reactive power control system may further include devices such as a computer, a server and an auxiliary electric power device. For example, auxiliary electric power device is a switch, a gateway and a cable.

Figure 5:
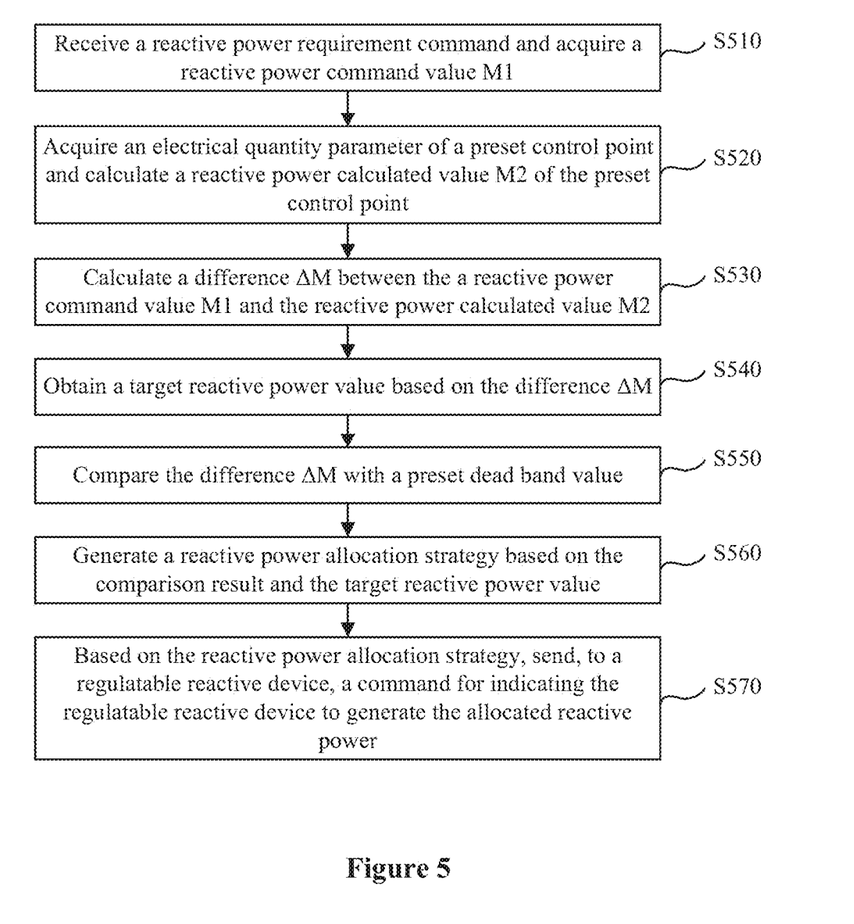
FIG. 5 is a schematic flowchart of a reactive power control method according to an embodiment of the present disclosure.

FIG. 5 is a schematic flowchart of a reactive power control method according to an embodiment of the present disclosure.

The above control device 200 may serve as an implementation subject of the control method to perform the following steps. It can be understood that, the implementation subject of the control method may be other function units or function modules, which is not limited herein.

As shown in FIG. 5, in S510, a reactive power requirement command is received and a reactive power command value M1 is acquired based on the reactive power requirement command.

In S520, an electrical quantity parameter of a preset control point is acquired and a reactive power calculated value M2 of the preset control point is calculated based on the electrical quantity parameter.

In the embodiment, the electrical quantity parameter of the present control point may be acquired by in a hardwired manner. Particularly, a PT signal and a CT signal of the control point may be respectively acquired with PT and CT.

In S530, a difference $\Delta M$ between the reactive power command value M1 and the reactive power calculated value M2 is calculated.

In the embodiment, the above calculation is a subtraction operation.

In S540, a target reactive power value is obtained based on the difference $\Delta M$.

In S550, the difference $\Delta M$ is compared with a preset dead band value.

In the embodiment, the above comparison may be a difference comparison.

In S560, a reactive power allocation strategy is generated based on the comparison result and the target reactive power value.

The reactive power allocation strategy may be used for calculating a reactive power capability value of a regulatable reactive device in a wind power generation site and allocating reactive power to be provided by the regulatable reactive device. The regulatable reactive device may include a wind power generator set and a reactive power compensation device. The reactive power compensation device may include at least one of: a photovoltaic inverter, a capacitor, a static var compensator SVC and a static var generator SVG In S570, based on the reactive power allocation strategy, it is sent to the regulatable reactive device a command for indicating the regulatable reactive device to generate the allocated reactive power.

In the embodiment of the present disclosure, the difference between the reactive power command value M1 and the reactive power calculated value M2 is calculated. The difference is compared with the preset dead band value to generate the reactive power allocation strategy. Then, the reactive power control is performed based on the reactive power allocation strategy. Multiple types of coordinated control are achieved by information interaction between the control device and the control object. In this case, the regulation capability of the regulatable reactive device in the wind power generation site is fully and effectively utilized, thereby reducing the power loss, improving the output of the wind power generation site and increasing the power generation benefits.

In the embodiment, the step of generating the reactive power allocation strategy may include S261 to S263.

In S261, the difference ΔM is compared with a first preset dead band value.

In S262, if the difference ΔM is greater than the first preset dead band value, a first reactive power capability value N1 of one or more wind power generators of the wind power generation set is calculated.

In S263, reactive power to be provided by the one or more wind power generators is allocated based on the target reactive power value and the first reactive power capability value N1.

An application scenario of this embodiment may be that, the wind in a wind power generation site is strong, a wind power generator meets the above safety constraint condition, a required regulation amount is within a safety boundary of the wind power generator, and a wind power generator set can complete an assigned task. In this case, control may be performed in the manner described in the embodiment.

The preset dead band value may indicate a voltage fluctuation. The preset dead band value may be set as needed. For example, the first preset dead band value is 3% of a target value, that is, a control is needed in the case that the voltage fluctuation reaches 3%.

Therefore, a reactive power capability of the wind power generator can be released maximally in the embodiment. Following content is indicated by data obtained in a large quantity of experiments.

In the case of a steady operation of the wind power generation site, the wind power generator can provide reactive power for 33% of installed capacity of the wind power generation site. In the case that the system is in a low-voltage ride-through state, the wind power generator can maximally provide a reactive current support for 100% of the rated current of the wind power generator. In the case of the steady operation of the wind power generation site, the centralized reactive power compensation output may be reduced and even canceled, thereby reducing the power consumption and improving the overall benefits of the wind power generation site.

Taking a wind power generation site with fifty thousands installed capacity in which all wind power generators are GW1.5 MW wind power generators, as an example, in the case of the steady operation of the wind power generation site, reactive power compensation capacity provided by all of the wind power generators is in a range from −16500 kVvar to +16500 kVvar. In the case that a low-voltage fault occurs in the wind power generation site, each of the wind power generators can maximally provide capacitive reactive current of 1500 A during the fault. A response time duration of the reactive current of the wind power generator may be shorter than 50 ms.

As a variant of the embodiment of generating the reactive power allocation strategy, S264 to S266 may be added based on S261 to S263.

In S264, the difference ΔM is compared with a second preset dead band value which is greater than the first preset dead band value.

In S265, a second reactive power capability value N2 of the reactive power compensation device is calculated if the difference ΔM is greater than the second preset dead band value.

In S266, reactive power to be provided by the reactive power compensation device is allocated based on the target reactive power value and the second reactive power capability value N2.

An application scenario of the embodiment may be that, the wind in a wind power generation site is normal, and devices such as a wind power generator and SVG meet the above safety constraint condition. In this case, control may be preformed in the manner in this embodiment.

As another variant of the embodiment of generating the reactive power allocation strategy, S267 to S268 may be added based on S264 to S265.

In S267, the difference ΔM is compared with a third preset dead band value which is greater than the second preset dead band value.

In S268, if the difference ΔM is greater than the third preset dead band value, reactive power to be generated by the wind power generator set and reactive power to be generated by the reactive power compensation device is allocated based on the target reactive power value, the first reactive power capability value N1 and the second reactive power capability value N2.

An application scenario of the embodiment may be that, the wind in the wind power generation site is weak, a wind power generator does not meet the above safety constraint condition, a required regulation amount is not within a safety boundary of the wind power generator, and a wind power generator set can not complete an assigned task. In this case, control may be performed in the manner described in this embodiment.

Figure 6:
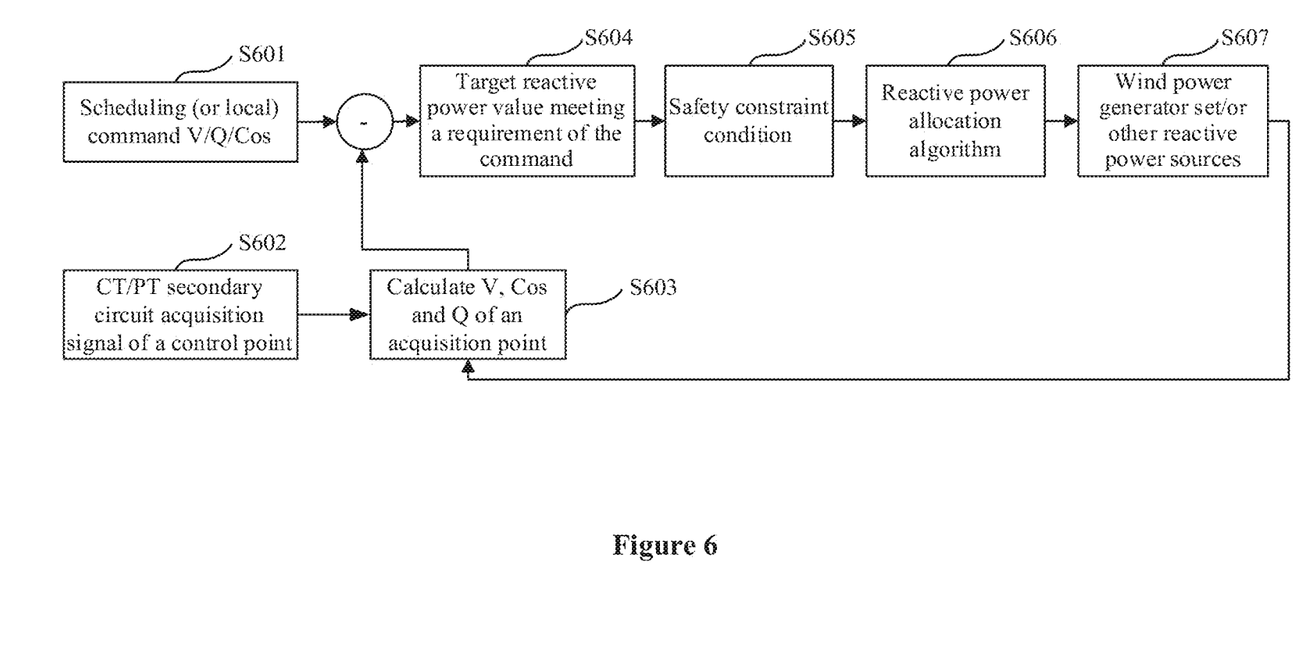
FIG. 6 is a schematic flowchart of a reactive power control method according to another embodiment of the present disclosure.

FIG. 6 is a schematic flowchart of a reactive power control method according to another embodiment of the present disclosure.

As shown in FIG. 6, the control method may include S601 to S607.

In S601, a reactive power requirement command is received.

The command may be sent from a scheduling device or may be locally sent by the control device 200. In the following, three cases are described in detail. For example, in the case of a voltage control mode, a voltage requirement command V is received; in the case of a reactive power control mode, a reactive power requirement command Q is received; and in the case of a power factor control mode, a power factor requirement command Cos is received.

In S602, a CT/PT secondary circuit acquisition signal of a preset control point is acquired.

An acquired basic signal includes a voltage value and a current value, and electrical quantity parameters for the respective control modes may be acquired by calculating based on the voltage value and current value.

In S603, V, Cos and Q of acquisition points are calculated.

For example, V of the acquisition point is calculated in the case of the voltage control mode, Q of the acquisition point is calculated in the case of the reactive power control mode, and Cos of the acquisition point is calculated in the case of the power factor control mode.

In S604, a target reactive power value meeting the requirement of the command is calculated In S605, performing a constraint with a safety constraint condition.

In S606, reactive power to be allocated is calculated with a reactive power allocation algorithm.

In S607, reactive power to be generated by the wind power generator set or other reactive power sources (i.e., the above regulatable reactive device) is allocated.

In the embodiment, the reactive power control method may include a remote control manner and a local control manner. Each of the two control manners includes three control modes: a voltage control mode, a reactive power control mode and a power factor control mode.

In an optional embodiment, the control method may further includes:

presetting a voltage control mode;

where, in the voltage control mode, the reactive power command value M1 is a voltage command value UCMD, the electrical quantity parameter is a voltage U, the difference ΔM is a voltage ΔU, and the voltage ΔU is a difference between the voltage command value UCMD and the voltage U.

In the case that the control point is in the voltage mode, a reactive power is calculated with following formula:

$$\Delta Q=(\Delta U X) \times UCMD,$$

where X represents a system impedance and UCMD is a voltage command value.

In another optional embodiment, the control method may further include:

presetting a reactive power control mode;

where, in the reactive power control mode, the electrical quantity parameter includes a voltage U and a current I, and the reactive power calculated value M2 is reactive power Q which is calculated based on the voltage U and the current I.

The reactive power control is a closed-loop control. The system may detect the reactive power command issued by the scheduling device, calculate reactive power of a grid-connected point based on the acquired voltage-current command of the control point, and perform adjustment if a difference between the reactive power command value and the calculated reactive power value is greater than a dead band value, to ensure an accuracy of the control.

In anther optional embodiment, the control method may further include:

presetting a power factor control mode;

where, in the power factor control mode, the electrical quantity parameter includes a voltage U and a current I, and the reactive power calculated value M2 is reactive power Q which is calculated by steps of:

calculating active power P of the preset control point and a phase difference Φ between the voltage U and the current I, based on the voltage U and the current I; and calculating the reactive power Q based on the active power P and the phase difference Φ.

Strategy of the power factor control is similar to the strategy of the voltage control. In the case that the control point is in the power factor mode, the power factor control is similar, and a reactive power is calculated with following formula:

$$Q=P \times \tan(a \cos(\cos \text{ command})),$$

where "command" is a control command issued by a remote terminal or a local terminal.

Reactive power sources (such as wind power generator and centralized reactive power compensation device) of the wind power generation site may be centralizedly controlled and regulated by selecting different control modes. In each of the control modes, a target reactive power value can be obtained by conversion via a reasonable control algorithm, while all safety constraint conditions (of which content is described hereinafter) are considered. Different control commands of different reactive power sources are formed with an inner reactive power allocation strategy, and the control point is detected and is compared with the target value in real time to obtain a difference between the control point and the target value, in this way, a closed-loop control is formed.

Response conditions of the reactive power control strategy may include:

1. |command value-calculated value|>preset dead band value;
2. VMP system having no alarm;
3. VMP system being operating; and
4. voltage and frequency of the power grid are in a normal operation range.

In addition, control priorities of wind power generators and reactive power compensation devices in a wind power generation site may be selected based actual cases and scheduling requirements of the wind power generation site. For example, it may be selected a first control priority, a second control priority and a third control priority.

In the first control priority, it is controlled with priority of taking a self reactive power capability of a wind power generator as main reactive power compensation for the wind power generation site, and a reactive power capability of a reactive power compensation device such as SVG is taken as a backup.

In the second control priority, it is controlled with priority of taking the reactive power capability of SVG as main reactive power compensation for the wind power generation site, and the reactive power capability of a wind power generator set is taken as a backup.

In the third control priority, reactive power of the SVG and the wind power generator are controlled simultaneously to allocate reactive power to be provided by the wind power generator and SVG according to a certain principle.

The following cases are generally considered in selecting the control priority.

In a first case, the wind in a wind power generation site is strong, a wind power generator meets the above safety constraint condition, a required regulation amount is within a safety boundary of the wind power generator, and a wind power generator set can complete an assigned task. In this case, the first control priority may be selected to perform control.

In a second case, the wind in the wind power generation site is weak, a wind power generator does not meet the above safety constraint condition, a required regulation amount is not within a safety boundary of the wind power generator, and a wind power generator set can not complete an assigned task. In this case, the second control priority is selected to perform control.

In a third case, the wind in a wind power generation site is normal, and devices such as a wind power generator and SVG meet the above safety constraint condition. In this case, the third control priority may be selected to perform control.

In an optional embodiment, S280 to S290 may be added based on the above embodiments.

In S280, a safety constraint condition is acquired.

In S290, a reactive power allocation strategy is generated based on the safety constraint condition, the comparison result and the target reactive power value.

The safety constraint condition includes at least one of: a voltage limit constraint of the preset control point; a voltage abrupt change amount constraint of the preset control point; a terminal voltage constraint of the wind power generator, a maximum reactive power capability and available reactive power capability constraint of the wind power generator, a temperature constraint of a converter of the wind power generator; and a maximum reactive power compensation capability constraint of the reactive power compensation device.

Therefore, with the embodiment, it is ensured that the wind power generator set and the wind power generation site operate safely and steadily, and the safety of the reactive power compensation device is ensured.

In an optional embodiment, S2100 to S2120 may be added based on the above embodiments.

In S2100, operation data in a reactive power control process is acquired in real time.

In S2110, the operation data acquired in real time is analyzed and displayed in real time.

In S2120, the data displayed in real time is monitored.

The device and system for controlling reactive power in the wind power generation site according to the embodiments of the present disclosure may correspond to implementation subject in the method for controlling reactive power in the wind power generation site according to the embodiments of the present disclosure. The device and system can perform steps of the control method, and are not described hereinafter for simplicity. In several embodiments according to the present application, it should be understood that the disclosed system, device and method can be implemented in other ways. For example, the device embodiments described above are merely schematic, the division of the units is merely a logic functional division, and there may be other divisions in practice. For example, multiple units or components can be combined, or can be integrated into another system, or some features can be ignored, or not be executed. In addition, the coupling, direct coupling or communication connection between components which are shown or discussed may be indirect coupling or communication connection via some interfaces, devices or units, which may be electrical, mechanical, or in other form.

Specific embodiments of the present disclosure are disclosed as described above, the scope of protection of the present disclosure is not limited thereto. Various equivalent changes and alteration which may be thought by those skilled in the art in the technical scope disclosed by the present disclosure should fall within the scope of protection of the present disclosure.

The invention claimed is:

1. A reactive power control device, comprising:
a communication interface, configured to receive a reactive power requirement command;
an input interface, configured to acquire an electrical quantity parameter of a preset control point;
a strategy calculation module, configured to calculate a target reactive power value meeting the reactive power requirement command based on the electrical quantity parameter, and allocate reactive power to be provided by a regulatable reactive device based on the target reactive power value; and
an output interface, configured to send a command for providing the allocated reactive power to the regulatable reactive device.

2. The device according to claim 1, wherein the regulatable reactive device comprises a wind power generator set and a reactive power compensation device, wherein the reactive power compensation device comprises at least one of: an inverter, a capacitor, a static var compensator SVC and a static var generator SVG, in a new energy site.

3. The device according to claim 1, wherein the regulatable reactive device comprises a wind power generator set and a reactive power compensation device, wherein the reactive power control device further comprises:
a safety limit control module, configured to set a safety constraint condition for voltage control and send a safety control command to the strategy calculation module, wherein the safety control command is used for instructing the strategy calculation module to make the safety constraint condition be met in allocating the reactive power.

4. The device according to claim 3, wherein the safety constraint condition comprises at least one of:
a voltage limit constraint of the preset control point;
a voltage abrupt change amount constraint of the preset control point;
a terminal voltage constraint of the wind power generator set;
a maximum reactive power capability and available reactive power capability constraint of the wind power generator set;
a temperature constraint of a converter of the wind power generator set; and
a maximum reactive power compensation capability constraint of the reactive power compensation device.

5. The device according to claim 1, further comprising:
a control mode module, configured to provide at least one of a voltage control mode, a reactive power control mode and a power factor control mode, in a local control manner or a remote control manner.

6. The device according to claim 5, further comprising:
a voltage control module, configured to select the voltage control mode; wherein
the communication interface is further configured to receive a voltage requirement command under the voltage control mode; and
the input interface is further configured to acquire a voltage parameter of the preset control point under the voltage control mode.

7. The device according to claim 5, further comprising:
a reactive power control module, configured to select the reactive power control mode; wherein
the communication interface is further configured to receive a reactive power requirement command under the reactive power control mode; and
the input interface is further configured to acquire a reactive power parameter of the preset control point under the reactive power control mode.

8. The device according to claim 5, further comprising:
a power factor control module, configured to select the power factor control mode; wherein
the communication interface is further configured to receive a power factor requirement command under the power factor control mode; and
the input interface is further configured to acquire a power factor parameter of the preset control point under the power factor control mode.

9. The device according to claim 5, wherein,
in the local control manner, an interface point between a main transformer and a low-voltage side bus in a new energy site is determined as the preset control point; and
in the remote control manner, an interface point between the main transformer and a high-voltage side bus in the new energy site is determined as the preset control point.

10. A reactive power control system, comprising:
at least one wind power generator set arranged on an aggregate line;
a control device, connected to the at least one wind power generator set via a communication line;
a reactive power compensation device communicatively connected to the at least one wind power generator set and the control device; and
a data acquisition device, configured to acquire an electrical quantity parameter of a preset control point and connected to the control device via a communication line, wherein the control device comprises:
- a communication interface, configured to receive a reactive power requirement command;
- an input interface, configured to acquire an electrical quantity parameter of a preset control point;
- a strategy calculation module, configured to calculate a target reactive power value meeting the reactive power requirement command based on the electrical quantity parameter, and allocate reactive power to be provided by a regulatable reactive device based on the target reactive power value; and
- an output interface, configured to send a command for providing the allocated reactive power to the regulatable reactive device.

11. A reactive power control method, comprising:
receiving a reactive power requirement command and acquiring a reactive power command value M1 based on the reactive power requirement command;
acquiring an electrical quantity parameter of a preset control point and calculating a reactive power calculated value M2 of the preset control point based on the electrical quantity parameter;
calculating a difference ΔM between the reactive power command value M1 and the reactive power calculated value M2;
obtaining a target reactive power value based on the difference ΔM;
comparing the difference ΔM with a preset dead band value;
generating a reactive power allocation strategy based on the comparison result and the target reactive power value, wherein the reactive power allocation strategy is used for calculating a reactive power capability value of a regulatable reactive device in a wind power generation site and allocating reactive power to be provided by the regulatable reactive device; and
sending a command, for indicating the regulatable reactive device to generate the allocated reactive power, to the regulatable reactive device, based on the reactive power allocation strategy.

12. The method according to claim 11, wherein the regulatable reactive device comprises a wind power generator set and a reactive power compensation device,
wherein the generating the reactive power allocation strategy comprises:
comparing the difference ΔM with a first preset dead band value, and if the difference ΔM is greater than the first preset dead band value, calculating a first reactive power capability value N1 of the wind power generator set; and
allocating reactive power to be provided by the wind power generator set based on the target reactive power value and the first reactive power capability value N1.

13. The method according to claim 12, wherein the generating the reactive power allocation strategy further comprises:
comparing the difference ΔM with a second preset dead band value which is greater than the first preset dead band value;
calculating a second reactive power capability value N2 of the reactive power compensation device if the difference ΔM is greater than the second preset dead band value; and
allocating reactive power to-be-provide by the reactive power compensation device based on the target reactive power value and the second reactive power capability value N2.

14. The method according to claim 13, wherein the generating the reactive power allocation strategy comprises:
comparing the difference ΔM with a third preset dead band value which is greater than the second preset dead band value; and
if the difference ΔM is greater than the third preset dead band value, allocating reactive power to be provided by the wind power generator set and reactive power to be provided by the reactive power compensation device, based on the target reactive power value, the first reactive power capability value N1 and the second reactive power capability value N2.

15. The method according to claim 11, comprising:
presetting a voltage control mode;
wherein, in the voltage control mode, the reactive power command value M1 is a voltage command value UCMD, the electrical quantity parameter is a voltage U, and the difference ΔM is a voltage ΔU which is a difference between the voltage command value UCMD and the voltage U.

16. The method according to claim 11, comprising:
presetting a reactive power control mode;
wherein, in the reactive power control mode, the electrical quantity parameter comprises a voltage U and a current I, and the reactive power calculated value M2 is reactive power Q which is calculated based on the voltage U and the current I.

17. The method according to claim 11, further comprising:
presetting a power factor control mode;
wherein, in the power factor control mode, the electrical quantity parameter comprises a voltage U and a current I, and the reactive power calculated value M2 is reactive power Q which is calculated by steps of:
calculating active power P of the preset control point and a phase difference Φ between the voltage U and the current I, based on the voltage U and the current I; and
calculating the reactive power Q based on the active power P and the phase difference Φ.

18. The method according to claim 11, wherein the regulatable reactive device comprises a wind power generator set and a reactive power compensation device,
wherein the reactive power compensation device comprises at least one of: an inverter, a capacitor, a static var compensator SVC and a static var generator SVG, in a new energy site,
wherein,
in a local control manner, an interface point between a main transformer and a low-voltage side bus in a new energy site is determined as the preset control point; and
in a remote control manner, an interface point between the main transformer and a high-voltage side bus in the new energy site is determined as the preset control point.

19. The method according to claim 11, wherein the regulatable reactive device comprises a wind power generator set and a reactive power compensation device,
wherein the reactive power compensation device comprises at least one of: an inverter, a capacitor, a static var compensator SVC and a static var generator SVG, in a new energy site,
wherein the method further comprises:
pre-acquiring a safety constraint condition; and generating the reactive power allocation strategy based on the safety constraint condition, the comparison result and the target reactive power value.

20. The method according to claim 19, wherein the safety constraint condition comprises at least one of:
- a voltage limit constraint of the preset control point;
- a voltage abrupt change amount constraint of the preset control point;
- a terminal voltage constraint of the wind power generator set;
- a maximum reactive power capability and available reactive power capability constraint of the wind power generator set;
- a temperature constraint of a converter of the wind power generator set; and
- a maximum reactive power compensation capability constraint of the reactive power compensation device.

* * * * *